Nov. 11, 1958  A. E. CUTLER  2,859,538
CATHODE RAY TUBE DISPLAY SYSTEMS OR APPARATUS
Filed Jan. 17, 1955  4 Sheets-Sheet 1

INVENTOR
Albert Ernest Cutler

Nov. 11, 1958  A. E. CUTLER  2,859,538
CATHODE RAY TUBE DISPLAY SYSTEMS OR APPARATUS
Filed Jan. 17, 1955  4 Sheets-Sheet 2
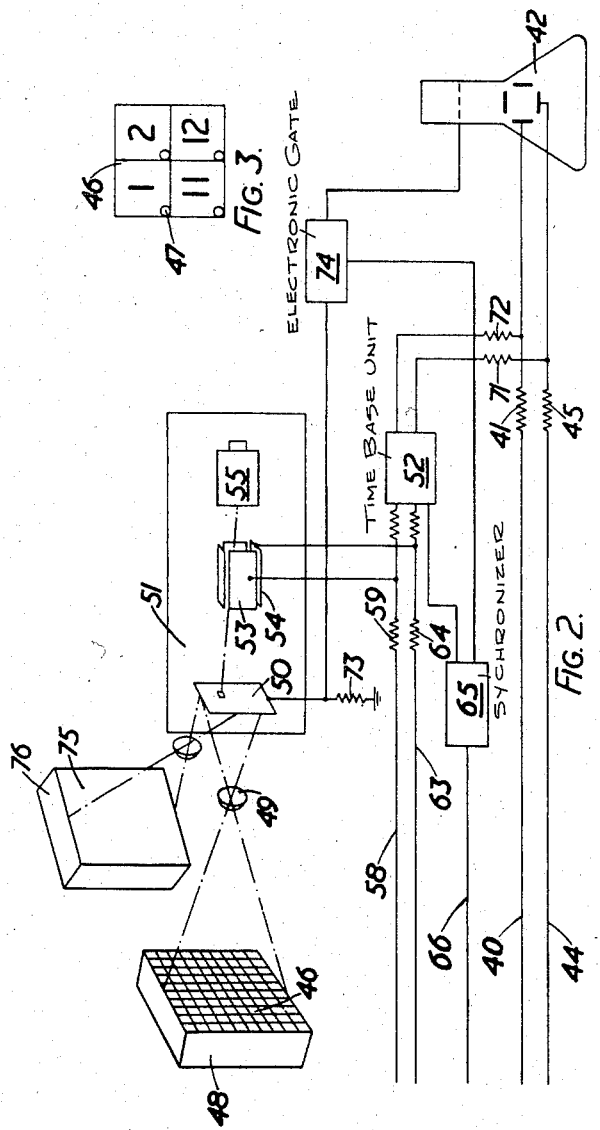
INVENTOR
Albert Ernest Cutler

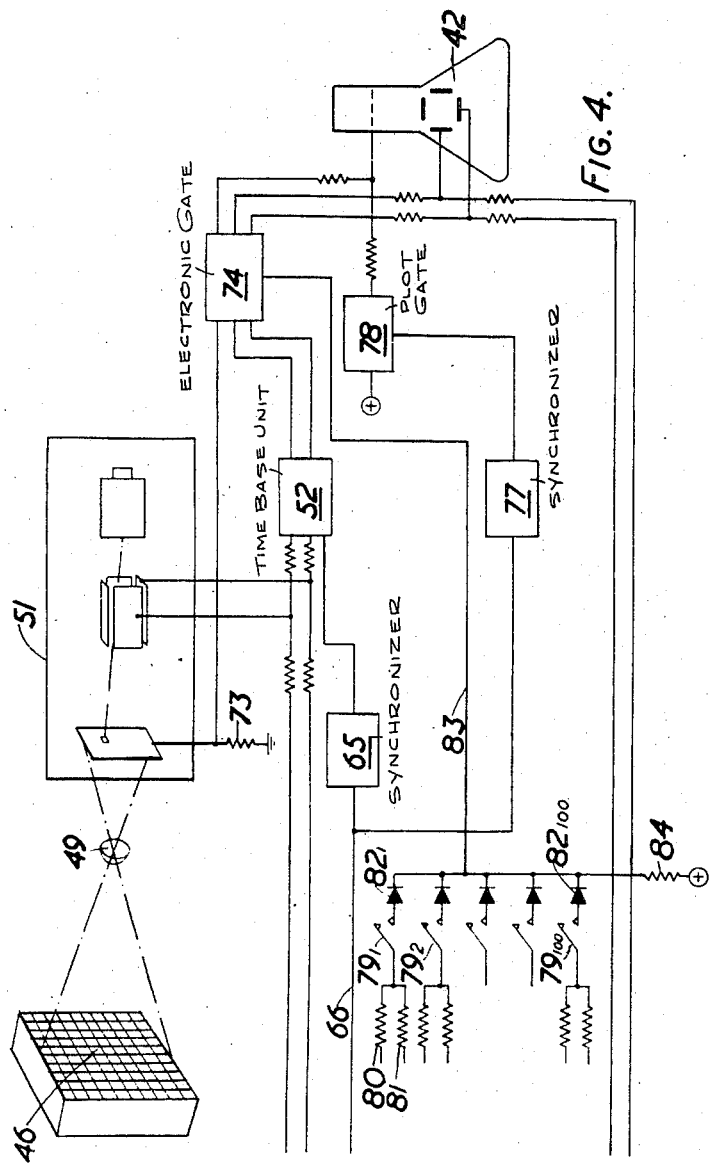

Nov. 11, 1958  A. E. CUTLER  2,859,538
CATHODE RAY TUBE DISPLAY SYSTEMS OR APPARATUS
Filed Jan. 17, 1955  4 Sheets-Sheet 4
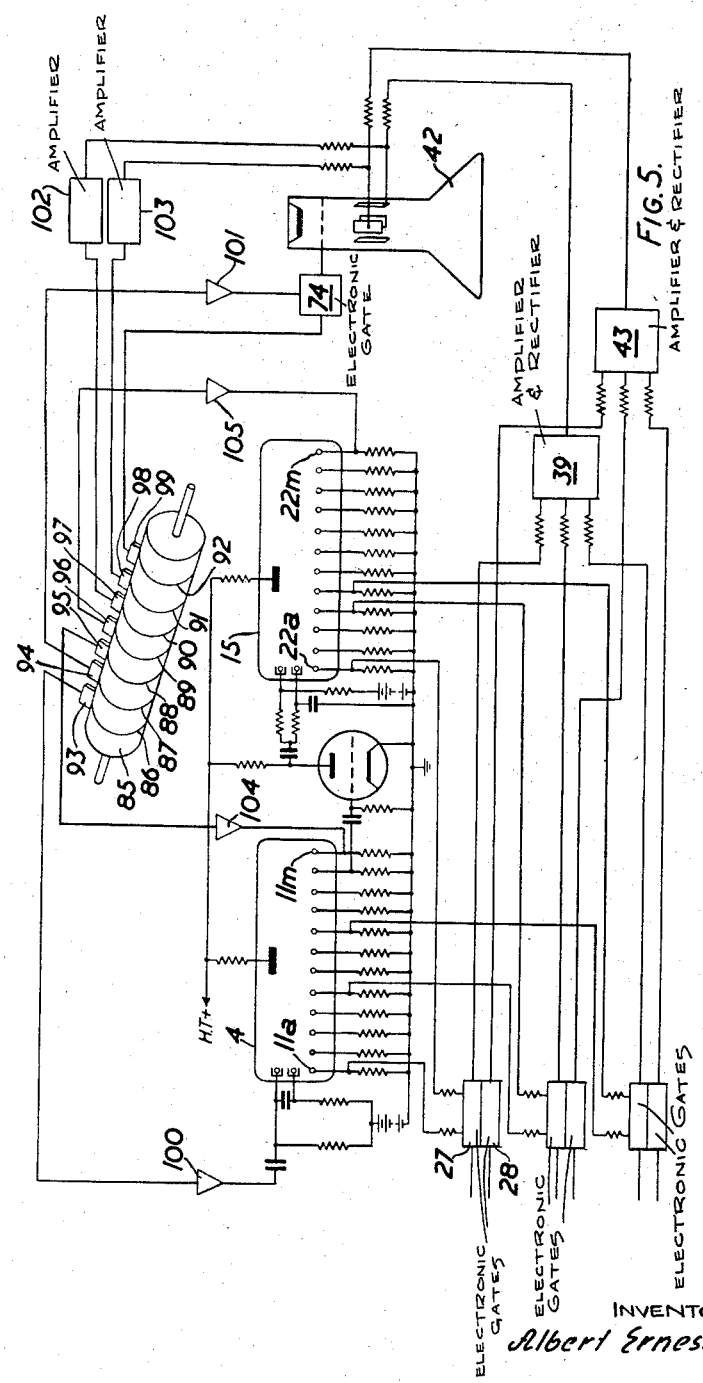
INVENTOR
Albert Ernest Cutler
BY Richard Lord Ag't United States Patent Office 2,859,538
Patented Nov. 11, 1958

2,859,538

CATHODE RAY TUBE DISPLAY SYSTEMS OR APPARATUS

Albert E. Cutler, Northgate, Crawley, England, assignor to Communications Patents Limited, London, England Application January 17, 1955, Serial No. 482,055

Claims priority, application Great Britain February 8, 1954

12 Claims. (Cl. 35—10.4)

This invention relates to the use of cathode ray tubes for displaying information.

The information which is displayed may represent, for example, the positions of a plurality of objects, or pairs of related conditions at different points in a system.

It is an object of the present invention to provide a two-dimensional display of information such that the information relating to a particular object or a particular point in a system is associated with the corresponding object or point by an observer watching the display.

The invention has a particular application to training apparatus for use in exercises in which it is essential to provide a display of the positions of a number of ships, aircraft or land vehicles. One system which has been used to provide such a display employs a number of operators who are periodically informed of the positions of the craft or vehicles to move numbered markers over a chart in accordance with this information. This system has a number of disadvantages. The information is periodically adjusted and is therefore not continuously correct. In fact, the display of information on the chart is never correct, being always subject to the delay (which may be important in the case of aircraft) caused by the calculation of the information, its communication to an operator and the time taken by the operator to move the marker. In addition, if there are a large number of craft or vehicles taking part in the exercise and if the marker positions are to be adjusted frequently, a large staff of operators is necessary to move the markers, and a large number of, for example, telephone operators to convey the information to the marker operators. Also, a large plotting table is necessary if the operators are to work satisfactorily and if the view of the table is not to be obscured by the operators themselves.

It is another object of the invention to provide apparatus enabling identified positional information relating to craft or vehicles to be displayed by a cathode ray tube.

According to the invention, apparatus for providing a two-dimensional display of data relating to the positions of a plurality of objects, or pairs of related conditions at different locations in a system, etc., comprises representations of a plurality of symbols denoting the objects, locations, etc. means cooperating with the said representations whereby video signals corresponding to the symbols are applied in succession to a cathode ray display tube, and means responsive to electric signals representing the data to be displayed in the form of two coordinates, whereby each symbol is positioned on the screen of the display tube at or adjacent to the point defined by the said co-ordinates thereby identifying the indicated data.

In the preceding paragraph and in the claims, the term "symbol" is intended to include a group of symbols which may be used to identify a particular object or point, and in the claims, the term "craft" is intended to include land vehicles.

Two embodiments of the invention will now be described, by way of example only, with reference to the accompanying drawings, which illustrate apparatus for use in carrying out an exercise involving ships, aircraft or land vehicles in which it is desired to have a display of the positions of the craft or vehicles taking part in the exercise. In the drawings:

Figures 1 and 2 show apparatus for providing on a cathode ray tube indications of the positions of the craft or vehicles, together with numbers showing the identity of the craft represented by the position indicated;

Figure 3 is a detail of a board containing the identification numbers of the craft;

Figure 4 shows a modification of the apparatus of Figures 1 and 2;

Figure 5 shows a further embodiment of the invention in which the numbers identifying the craft are recorded on a magnetic drum.

Figure 1:
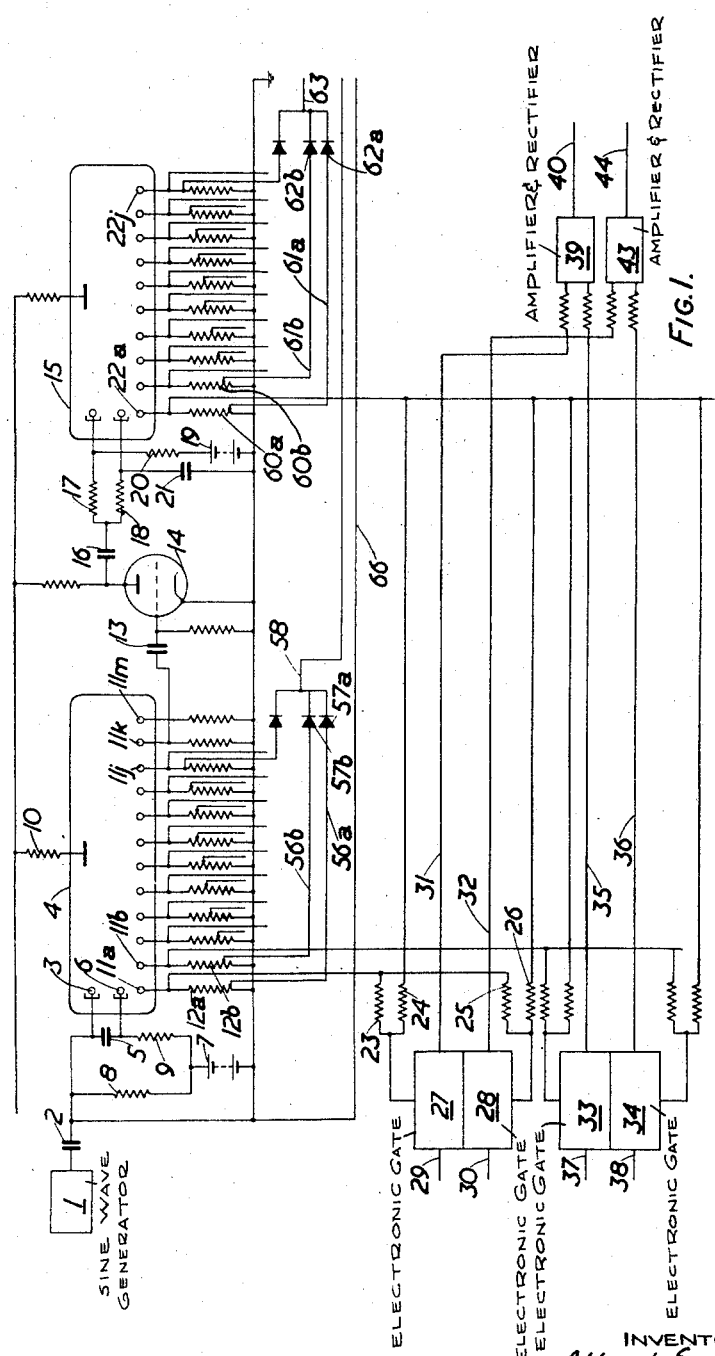

In the first embodiment to be described, a two-denominational dekatron pulse counter is stepped by a pulse generator. The pulse counter is used to open a plurality of electronic gates two at a time, the pair of gates which is open at any moment depending on the count reached by the pulse counter. To each pair of gates there are applied signals representing the co-ordinates of the position of a craft in an exercise. When the two gates are open, these co-ordinate signals are applied to the deflection circuits of a cathode ray display tube which is common to all the pairs of gates. In this way, spots are obtained on the screen of the display tube which represent the positions of the different craft in the exercise. In order to provide a numerical indication of the identity of the craft corresponding to a spot on the tube, the image of a board divided into numbered squares is projected on to the mosaic screen of an iconoscope which, as a spot appears on the display tube, is caused to scan the square containing the number corresponding to the craft whose position is indicated by the spot and to apply a corresponding video signal to the display tube, to which suitable small-area scanning potentials are applied, the number appearing on the screen of the latter against the corresponding spot. The number which is selected by the iconoscope is determined by biasing potentials which are applied to the deflection circuits of the iconoscope from the cathode circuits of the dekatrons.

In this embodiment the counting units are dekatrons of the kind having first and second guide electrodes which when suitable potentials are applied cause the glow to transfer from cathode to cathode.

In the drawing, the sine wave generator 1 is coupled through a D. C. blocking capacitor 2 to the second set of guide electrodes 3 of a twelve-cathode dekatron 4 and through a phase-advancing capacitor 5 to the first set of guide electrodes 6 of the dekatron. A positive bias is applied to these guide electrodes by a battery 7 by way of resistors 8 and 9. The anode of the dekatron is connected through a resistor 10 to a source of positive potential and the cathodes 11a, 11b, etc. are connected through resistors 12a, 12b, etc., to earth. When a sine wave input is received from the generator 1, the glow is transferred from one cathode to the next cathode in the dekatron, once per cycle of the sine wave, for example, in the manner described in the article "A Dial Pulse Generator" appearing in the Post Office Electrical Engineers Journal (U. K.), vol. 48, part 2, pages 84–86. When the glow reaches cathode 11k a potential is applied by way of capacitor 13 to an amplifying valve 14, from the anode of which a pulse is applied through a capacitor 16 and resistors 17 and 18 respectively to the guide electrodes of a second dekatron 15, having ten cathodes, which forms a second denominational counting bank. A battery 19 applies bias to the first guide electrodes of the dekatron 15 through a resistor 20 and to the second guide electrodes through the resistors 20, 17 and 18, a capacitor 21 causing a phase retardation of the signal applied to the second guide electrodes.

The first cathodes 11a and 22a of the two dekatrons are connected through resistors 23, 24, 25 and 26 to the control circuits of two high-speed electronic gates 27 and 28, each so arranged that when input potentials are applied to it simultaneously from the two cathodes the gate will open. When the gates 27 and 28 are open, signals corresponding to the input signals on conductors 29 and 30 are applied to the output conductors 31 and 32 respectively.

In a similar manner, the control circuits of the gates 33 and 34 are connected to the cathodes 11b and 22a of the two dekatrons, so that when these cathodes are conducting the gates 33 and 34 will open and will apply to the output conductors 35 and 36 respectively signals corresponding to the input signals on the conductors 37 and 38. Similarly, other pairs of gates are connected to other combinations of cathodes in the two dekatrons. Cathodes 11k and 11m are not connected to gate circuits, the cathode 11k being the transfer cathode and the period during which the flow rests on cathode 11m being reserved for the operation of the amplifying circuit and for the transfer of the flow from one cathode to the next in the second dekatron.

Thus by connecting ten cathodes of each dekatron to the gate circuits, one hundred pairs of gates can be opened in sequence, repeatedly, although for the purposes of the present embodiment it does not matter if some of the combinations of cathodes are not so used.

The signals applied to the input conductors 29 and 30 of the first pair of gates are A. C. voltages representing the Cartesian co-ordinates $x_1$ and $y_1$ of the position of a craft taking part in the exercise. Those applied to the conductors 37 and 38 represent the co-ordinates $x_2$ and $y_2$ of a second craft, and so on. The means for producing and determining the electrical co-ordinate signals which are made available at the input conductors, can be of any of the well-known devices. A common way of deriving these X and Y signals is to employ a pair of linear potentiometers which are arranged alongside adjoining edges of a chart, the wipers of these potentiometers being set at or driven into positions where they are coincident with the north-south and east-west positions respectively of the object or craft the position of which the signals are destined to be representative of. As an example, reference is made to United States Patent No. 2,560,528, wherein Fig. 2 shows an arrangement of this kind. The output signals $x_1$, $x_2$, etc., on conductors such as 31, 35 are applied to an amplifier and rectifier unit 39 from which a D. C. output signal representing in amplitude successively $x_1$, $x_2$, etc., is applied by way of a conductor 40 and a resistor 41 (Fig. 2) to the x-deflector plates of a cathode ray display tube 42. Similarly, the output signals $y_1$, $y_2$ from the gates are applied to an amplifier and rectifier unit 43 (Fig. 1), from which a D. C. output signal representing successively $y_1$, $y_2$, etc., is applied by way of a conductor 44 and a resistor 45 to the y-deflection plates of the display tube 42 (Fig. 2). Thus if suitably-timed brightening pulses were applied to the grid of the tube, the position of each craft in turn would be shown on the screen, and if the pulse rate of the pulse generator 1 were sufficient (e. g. 1,000 C. P. S.) these position indications would appear to be continuously shown on the screen.

A board 46 (Figs. 2 and 3) has its surface divided into small squares equal in number to the number of combinations of pairs of cathodes in the dekatrons, in this case one hundred, arranged with ten squares in the horizontal rows and ten squares in the vertical columns. These squares contain the identification numbers of craft taking part in the exercise. A small hole 47 is formed in the bottom left-hand corner of each square and these holes appear as bright spots owing to the presence of a light source and a diffusing screen in the box 48 at the back of the board. A lens 49 forms an image of the board on the mosaic screen 50 of an iconoscope 51. A time base unit 52 applies to the deflection plates 53, 54 of the iconoscope deflection potentials such as to cause the beam from the electron gun 55 to scan an area on the mosaic screen equal to the size of the image thereon of one of the numbered squares. The unit 52 may consist of any standard and conventional time base capable of producing and applying to the deflection plates 53 and 54 of the electron camera 51, and also to the deflection plates of the display tube 42, scanning potentials suitable for producing the familiar television type of scan, namely, a series of vertically displaced horizontal lines of scanning, such time bases being generally well known in the art. In addition, biasing potentials are applied to the deflection plates from the cathodes of the dekatrons. These biasing potentials are such that the electron beam in the iconoscope scans the portion of the mosaic screen having thereon the number of the craft whose position co-ordinates have been applied as deflection potentials to the display tube. The biasing potentials are derived from the cathode circuits of the dekatrons. Tappings are arranged on the resistors 12a, 12b, . . . in the cathode circuits of the dekatron 4, these tappings being so arranged that as the glow passes from cathode to cathode, there are applied to the conductors 56a, 56b, . . . in turn, potentials which are progressively greater as the glow passes from cathode to cathode from 11a to 11j. The conductors 56a, 56b, . . . are connected through rectifiers 57a, 57b, . . . to a common conductor 58 which is connected through a resistor 59 (Fig. 2) to the deflection plate 53 of the iconoscope. In a similar manner, tappings on the resistors 60a, 60b, . . . in the cathode circuits of the dekatron 15 are arranged so as to apply to the conductors 61a, 61b, . . . in turn a potential which is progressively greater as the glow passes from cathode to cathode, from 22a to 22j, and the conductors 61a, 61b, . . . are connected through rectifiers 62a, 62b, . . . to a common conductor 63 which is connected by way of a resistor 64 to the deflection plates 54 of the iconoscope.

It will be seen that the biasing potentials applied by way of conductors 58 and 63 to the deflection plates 53 and 54 of the iconoscope define different points on the mosaic screen according to the pair of cathodes from which the potentials were derived. The numbers on the board 46 are so arranged that when the small-area scanning potentials from the time base unit 52 are added to the biasing potentials on the deflection plates, the electron beam from the gun 55 will scan an area of the mosaic screen on which there appears the image of the number of the craft whose co-ordinate potentials have been applied through the appropriate gates to the deflection plates of the display tube. Correct timing of the application of the small-area scanning potentials is ensured by a synchronising unit 65 which is connected to the sine-wave generator 1 by way of conductor 66 and which applies a delay synchronising pulse to the time base unit once per cycle of the generator 1.

The small-area scanning potentials are also applied to the deflection electrodes of the display tube 42 through the resistors 71 and 72. The video signal which appears across the resistor 73, which connects the back plate of the mosaic screen of the iconoscope to earth, is applied through an electronic gate 74, to the grid of the display tube 42. The gate 74 is opened by the synchronizing pulse from the unit 65 and remains open for the duration of several frames of the small-area scanning potentials, in all less than one cycle of the sine wave generator. As a result, the identification number of each craft appears on the display tube at the side of a spot corresponding to the hole 47 which is in the position on the screen representing the location of the craft.

Thus if the speed of the sine wave generator is sufficient or if the persistence of the tube screen is sufficiently long, a continuous indication is presented of the position of all craft taking part in the exercise.

If desired, the heading of the craft could be shown on the display screen at the side of the spot representing the position of the craft. As an example of how this could be achieved, the board 75 shown in Figure 2 has fitted therein a number of heading indicators, one for each craft, which are operated by desyn receiver units arranged behind the indicators in the box 76. The desyn transmitter units can be operated remotely according to the computed headings of the craft. An image of this board also is formed on the mosaic screen 50. Alternatively, each square on the board 46 could contain both an identification number and a heading indicator.

It may sometimes be desirable for the person watching the display tube to be able to black out the identification numbers, or any particular number, while retaining on the screen the position-indicating spots. This facility is provided if the circuits shown in Figures 1 and 2 are modified as shown in Figure 4.

In the latter figure, the number board 46 is not provided with the pinholes in the corners of the squares, the position-indicating spots on the screen being obtained in another manner. A synchronising unit 77 triggered by the sine-wave generator through the conductor 66 applies a pulse to a plot gate 78 after a short delay sufficient to enable the co-ordinate potentials from the gates 27, 28 etc., to be established at the deflection electrodes of the display tube. This short pulse opens the plot gate 78 for a brief period during which a brightening pulse is applied through the gate to the grid of the display tube.

In Figure 4, the small-area scanning potentials from the time base 52, as well as the video signal across the resistor 73, are applied to the tube 42 through the identification gate unit 74. This gate unit, which in Figure 2 is controlled from the synchronising unit 65, is here controlled from the cathodes of the dekatrons, through the switches $79_1$ to $79_{100}$. The switch $79_1$ is connected through resistors 80 and 81 respectively to the cathodes 11a and 22a of the two dekatrons, switch $79_2$ to the cathodes 11b and 22a, and so on, one switch being provided for each combination of cathodes, and each cathode being thus connected to ten of the switches.

With one cathode conducting in each dekatron, one of the switches will be connected to the two conducting cathodes, and eighteen of the switches to one conducting and one non-conducting cathode, the remainder being connected to two non-conducting cathodes. The switches are connected by way of rectifiers $82_1$ to $82_{100}$ respectively to a common conductor 83 which is connected through a resistor 84 to a source of positive potential. The amplitude of the latter is chosen so that the potential which is applied from this source to the reverse side of the rectifiers is greater than the potential at the switches which are connected to only one conducting cathode, or to two non-conducting cathodes, but less than that at the switch which is connected to the two conducting cathodes. In this way, it is ensured that only one rectifier conducts (that associated with the latter switch) and that the potential which is applied by way of the common conductor 83 to the control circuit of the identification gate 74 is the potential applied to this switch. This results in the opening of the gate and the application of the video signal and the small-area scanning potentials to the grid and deflection electrodes respectively of the tube 42.

If any switch is opened, the gate receives no control signal when the cathodes on which the glow rests in the two dekatrons are those connected to the opened switch; the gate then remains closed while this pair of cathodes is conducting and prevents the application of the video signal and the small-area scanning potentials from the time base unit 52 to the display tube electrodes. If all the switches are opened, no identification numbers appear on the screen.

The delay in the opening of the identification gate 74 is arranged to be such that the scanning potentials and the video signal from the iconoscope are applied to the display tube after the application thereto of the brightening pulse from the plot gate.

It would be possible to apply the deflection potentials representing the position of the craft (as well as the numeral-selecting potentials from the dekatrons) to the electron camera instead of to the display tube. To achieve this, the scanning beam of the camera would be made to scan an area equal to that of the whole of the mosaic screen, but the scanning beam would be biased by the position-representing and numeral-selecting potentials so that the selected numeral would be in a position in the scanned area corresponding to its desired position on the display screen. The whole of the scanning signals except those representing a small area centered on the said position would then be blacked out using known techniques, so that the resultant video signals contained only a signal representing the selected numeral, in a position in the frame and line scanning cycles representing the ground position of the corresponding craft.

In the second embodiment, shown in Figure 5, the pulse generator 1, the squared board 46, the electron camera 51, the time base 52, and the synchronising unit 65 are replaced by a drum having thereon magnetic tracks which co-operate with magnetic reading heads which provide the video signals corresponding to the identification numerals, the deflection signals for the display tube, and synchronising signals and clock pulses.

In Figure 5, parts which are the same as parts shown in Figures 1 and 2 have been given the same reference numerals. These parts include the dekatron counting circuits, the gates 27, 28, etc., and the amplifier and rectifier units 39 and 43.

A magnetic recording drum 85 has thereon seven recording tracks 86–92 co-operating with seven magnetic reading heads 93–99. The first track 86 stores a record of sine-wave pulses, which are applied from the corresponding reading head 93 through an amplifier 100 to the dekatron 4 when the drum is in rotation. As described with reference to Figures 1 and 2, the dekatrons then begin to count the pulses and the gates such as 27—28 are opened in successive pairs. The second track 87 has thereon a record of the video intensities obtained by scanning a sequence of identification numerals using an electron camera. This track co-operates with a reading head 94 from which the video signals are applied through an amplifier 101 and the gate 74 to the grid of the display tube 42.

The third and fourth tracks 88 and 89 store synchronising pulses, the nature and purpose of which will be explained hereinafter.

The fifth and sixth tracks 90 and 91 have thereon records of the frame and line scanning voltages which were used for the camera by means of which the record of the video signals was obtained. The frame and line voltages from the corresponding reading heads 97 and 98 are applied to amplifiers 102, 103; the signals from these amplifiers have amplitudes equal to those of the small-area scanning potentials provided by the time base unit 52 in Figure 2 for the cathode ray tube 42. These signals are added to the co-ordinate signals from the amplifier and rectifier units 39 and 43, the resultant voltages established at the deflector plates of the tube 42 being such that each identification numeral is shown on the screen at the point defined by the co-ordinate potentials.

The seventh track 92 stores a record of signals corresponding to the position of each video signal on the second track, the pulses from the corresponding reading head 99 being used to control the gate 74 through which the video signals are applied to the grid of the tube 42.

This ensures that no trace will be shown on the screen of the tube as the scanning spot moves from the position of one craft to that of the next.

The synchronising pulses from the reading heads 95 and 96, co-operating with the third and fourth tracks 88 and 89, are intended to ensure that the correct identification numeral is associated with each pair of coordinates, and are applied through amplifiers 104 and 105 to the cathodes 11m and 22m of the dekatrons. (In Figure 5, the dekatron 22 has twelve cathodes, like the dekatron 11.) These synchronising pulses are sufficiently negative to attract the glow to the cathode 11m or 22m, whatever its previous position in the dekatron, so that the opening of the pairs of gates such as 27—28 is kept in step with the application of the identification numeral signals.

The video signal recorded on the magnetic drum may be modified so that, when it is reproduced on the display tube screen, a spot appears in a position representing the ground position of the craft, adjacent the identification numeral. Alternatively a pulse such as to provide a spot on the display screen when applied to the grid of the tube 42 may be recorded on a separate track, so that the numeral can be switched out if desired, leaving the position-indicating spot on the screen.

It is to be understood that other recording media might be used in place of the magnetic drum of Figure 5; for example photo records could be used in conjunction with light-sensitive cells.

What I claim is:

1. Apparatus providing, on the screen of a cathode ray tube having a brightness control circuit, a display which represents the positions of a plurality of objects and includes symbols whereby these objects are identified, comprising deflection circuits operative with respect to said cathode ray tube, a plurality of sources of electrical co-ordinate signals, each source corresponding to a particular and different object and the co-ordinate signals from any one source being representative of the position of that particular object, switching means serving to apply in cyclic order to said deflection circuits the co-ordinate signals from said plurality of sources, signal-generating means serving to generate in the same cyclic order video signals representing a corresponding plurality of symbols, each symbol being destined to identify a separate one of the objects, a source of scanning signals corresponding to said video signals, and switching means serving to apply to the brightness control circuit of the cathode ray tube those video signals which represent the symbol pertaining to the particular object corresponding to the co-ordinate signals being applied at that time to the deflection circuits, so that, with the aid of said scanning signals, each symbol is displayed on the screen of the cathode ray tube at a position which is determined by the coordinate signals pertaining to the particular object which the symbol identifies.

2. Apparatus providing, on the screen of a cathode ray tube having a brightness control circuit, a display which represents the positions of a plurality of objects and includes symbols whereby these objects are identified, comprising deflection circuits operative with respect to said cathode ray tube, a plurality of sources of electrical co-ordinate signals, each source corresponding to a particular and different object and the co-ordinate signals from any one source being representative of the position of that particular object, switching means serving to apply in cyclic order to said deflection circuits the co-ordinate signals from said plurality of sources, signal-generating means serving to generate in the same cyclic order video signals representing a corresponding plurality of symbols, each symbol being destined to identify a separate one of the objects, a source of scanning signals corresponding to said video signals, switching means serving to apply to the brightness control circuit of the cathode ray tube those video signals which represent the symbol pertaining to the particular object corresponding to the co-ordinate signals which are being applied at that time to the deflection circuits, so that, with the aid of said scanning signals, each symbol is displayed on the screen of the cathode ray tube at a position which is determined by the co-ordinate signals pertaining to the particular object which the symbol identifies, and means serving to establish on the screen of the tube, in association with each displayed symbol, a spot which serves to indicate the position of the object which the symbol identifies.

3. Apparatus as in claim 2, further comprising personally operable switching means which, for one condition thereof, prevents application to the brightness control circuit of the cathode ray tube of video signals corresponding to a symbol, thus preventing establishment of a display of said symbol on the screen of the cathode ray tube, while, at the same time, the spot associated with said symbol continues to be displayed on said screen.

4. Apparatus providing, on the screen of a cathode ray tube having a brightness control circuit, a display which represents the positions of a plurality of objects and includes symbols whereby these objects are identified, comprising deflection circuits operative with respect to said cathode ray tube, a plurality of sources of electrical co-ordinate signals, each source corresponding to a particular and different object and the co-ordinate signals from any one source being representative of the position of that particular object, switching means serving to apply in cyclic order to said deflection circuits the co-ordinate signals from said plurality of sources, a plurality of representations of symbols, each symbol being destined to identify a separate one of the objects, signal-generating means co-operating with said representations to generate in the same cyclic order video signals which are representative of said plurality of symbols, a source of scanning signals corresponding to said video signals, and switching means serving to apply to the brightness control circuit of the cathode ray tube those video signals which represent the symbol pertaining to the particular object corresponding to the co-ordinate signals which are being applied at that time to the deflection circuits, so that, with the aid of said scanning signals, each symbol is displayed on the screen of the cathode ray tube at a position which is determined by the co-ordinate signals pertaining to the particular object which the symbol identifies.

5. Apparatus as in claim 4; further comprising a visual representation of the plurality of symbols, an electron camera having a mosaic screen therein, and deflection circuits, optical means for forming on the mosaic screen a single image containing all said symbols, and means arranged to apply to the deflection circuits of the electron camera scanning potentials such as to cause the electron beam in the camera to scan at any one time an area of the mosaic screen corresponding to the area occupied by any one only of said symbols and to apply to the display cathode ray tube corresponding scanning potentials of amplitudes, such that the resulting symbol displayed on the screen of the display cathode ray tube occupies a small area only of said screen.

6. Apparatus as in claim 4; further comprising a visual representation of the plurality of symbols, a visual representation of a spot in association with each of said symbols, each spot being representative of the object which the particular symbol identifies, an electron camera having a mosaic screen therein and deflection circuits, optical means for forming on the mosaic screen a single image containing all said symbols and associated spots, and means arranged to apply to the deflection circuits of the electron camera scanning potentials such as to cause the electron beam in the camera to scan at any one time an area of the mosaic screen corresponding to the area occupied by any one only of the symbols and its associated spot and to apply to the display cathode ray tube corresponding scanning potentials of amplitudes such that the resulting symbol and spot displayed on the screen of the display cathode ray tube occupies a small area only of said screen.

7. Apparatus providing, on the screen of a cathode ray tube having deflection circuits and a brightness control circuit, a display which represents the positions of a plurality of objects and includes symbols whereby these objects are identified, comprising a plurality of sources of electrical co-ordinate signals, each source corresponding to a particular and different object and the co-ordinate signals from any one source being representative of the position of that particular object, switching means serving to apply in cyclic order to the deflection circuits of the cathode ray tube the co-ordinate signals from said plurality of sources, a recording of signals which are representative of video signals pertaining to a corresponding plurality of symbols, each symbol being destined to identify a separate one of the objects, reproducing means co-operating with said recording to generate in the same cyclic order video signals which are representative of the corresponding plurality of symbols, a source of scanning signals corresponding to said video signals, and switching means serving to apply to the brightness control circuit of the cathode ray tube those video signals which represent the symbol pertaining to the particular object corresponding to the co-ordinate signals which are being applied at that time to the deflection circuits, so that, with the aid of said scanning signals, each symbol is displayed on the screen of the cathode ray tube at a position which is determind by the co-ordinate signals pertaining to the particular object which the symbol identifies.

8. Apparatus as in claim 7; further comprising a further recording which is representative of frame and line deflection voltages corresponding to those used in the preparation of the recording which is representative of the symbols; and wherein a reproducing means co-operates with said further recording to constitute the source of scanning signals corresponding to the video signals which are representative of the symbols.

9. Apparatus providing, on the screen of a cathode ray tube having a brightness control circuit, a display which represents the positions of a plurality of objects and includes symbols whereby these objects are identified, comprising deflection circuits operative with respect to said cathode ray tube, a plurality of sources of electrical co-ordinate signals, each source corresponding to a particular and different object and the co-ordinate signals from any one source being representative of the position of that particular object, electronic gates established between said source and said deflection circuits, a pulsing system causing said gates to apply in cyclic order to said deflection circuits the co-ordinate signals from said plurality of sources, signal-generating means serving to generate in the same cyclic order video signals representing a corresponding plurality of symbols, each symbol being destined to identify a separate one of the objects, a source of scanning signals corresponding to said video signals, and switching means serving to apply to the brightness control circuit of the tube those video signals which represent the symbol pertaining to the particular object corresponding to the co-ordinate signals which are being applied at that time to the deflection circuits by the appropriate electronic gates, so that, with the aid of said scanning signals, each symbol is displayed on the screen of the tube at a position which is determined by the co-ordinate signals pertaining to the particular object which the symbol identifies.

10. Apparatus as in claim 9; wherein the pulsing system comprises a dekatron, the cathodes of which are connected respectively to the electronic gates.

11. Apparatus as in claim 9; wherein the pulsing system comprises a plurality of dekatrons arranged in the form of a plurality of denominational counter units, and combinations of cathodes in separate dekatrons are connected to a single electronic gate.

12. Apparatus providing, on the screen of a cathode ray tube having deflection circuits, and a brightness control circuit, a display which represents the positions of a plurality of objects and includes symbols whereby these objects are identified, comprising a plurality of sources of electrical co-ordinate signals, each source corresponding to a particular and different object and the co-ordinate signals from any one source being representative of the position of that particular object, electronic gates established between said sources and the deflection circuits of the cathode ray tube, a pulsing system, a dekatron in said pulsing system, said dekatron having its cathodes connected respectively to the electronic gates to cause said gates to apply in cyclic order to said deflection circuits the co-ordinate signals from said plurality of sources, signal-generating means serving to generate in the same cyclic order video signals representing a corresponding plurality of symbols, each symbol being destined to identify a separate one of the objects, a source of scanning signals corresponding to said video signals, a further electronic gate which serves to apply to the brightness control circuit of the cathode ray tube those video signals which represent the symbol pertaining to the particular object corresponding to the co-ordinate signals which are being applied at that time to the deflection circuits by the appropriate electronic gates, so that, with the aid of said scanning signals, each symbol is displayed on the screen of the tube at a position which is determined by the co-ordinate signals pertaining to the particular object which the symbol identifies, and personally-operable switches, each representing one of said symbols, and so arranged that operation of any one of said personally-operable switches breaks a connection between said further electronic gate and one of the cathodes of the dekatron, whereby the last mentioned gate is closed when the corresponding video signal is applied thereto and the corresponding symbol is prevented from appearing on the screen of the display tube.

References Cited in the file of this patent

UNITED STATES PATENTS

| | | |
|---|---|---|
| 2,073,370 | Goldsmith et al. | Mar. 9, 1937 |
| 2,164,297 | Bedford | June 27, 1939 |
| 2,168,049 | Skellett | Aug. 1, 1939 |
| 2,528,730 | Rines | Nov. 7, 1950 |
| 2,604,705 | Hisserich et al. | July 29, 1952 |
| 2,606,318 | Haworth et al. | Aug. 5, 1952 |
| 2,617,982 | Holschuh et al. | Nov. 11, 1952 |
| 2,624,043 | Gerwin et al. | Dec. 30, 1952 |
| 2,691,226 | Gaertner et al. | Oct. 12, 1954 |